US008842113B1

(12) United States Patent
Holt et al.

(10) Patent No.: US 8,842,113 B1
(45) Date of Patent: Sep. 23, 2014

(54) REAL-TIME VIEW SYNCHRONIZATION ACROSS MULTIPLE NETWORKED DEVICES

(75) Inventors: Jason Holt, Mountain View, CA (US); Daniel Barcay, San Francisco, CA (US)

(73) Assignee: Google Inc., Mountain View, CA (US)

( * ) Notice: Subject to any disclaimer, the term of this patent is extended or adjusted under 35 U.S.C. 154(b) by 272 days.

(21) Appl. No.: 13/005,845

(22) Filed: Jan. 13, 2011

Related U.S. Application Data

(60) Provisional application No. 61/348,586, filed on May 26, 2010.

(51) Int. Cl.
*G06T 19/00* (2011.01)

(52) U.S. Cl.
USPC .......................................................... 345/419

(58) Field of Classification Search
CPC .......... G06T 19/00; G06T 17/20; G06T 17/00
USPC ..................................... 345/419, 2.1, 2.2, 1.1
See application file for complete search history.

(56) References Cited

U.S. PATENT DOCUMENTS

| 5,956,046 | A * | 9/1999 | Kehlet et al. ................. 345/502 |
| 6,122,668 | A * | 9/2000 | Teng et al. .................... 709/231 |
| 2003/0151562 | A1 * | 8/2003 | Kulas ............................. 345/1.1 |
| 2004/0125044 | A1 * | 7/2004 | Suzuki ............................ 345/1.1 |
| 2006/0090122 | A1 * | 4/2006 | Pyhalammi et al. ....... 715/500.1 |
| 2007/0236502 | A1 * | 10/2007 | Huang et al. .................. 345/473 |
| 2009/0009593 | A1 * | 1/2009 | Cameron et al. ................ 348/51 |
| 2010/0053164 | A1 * | 3/2010 | Imai et al. ..................... 345/427 |

OTHER PUBLICATIONS

Gross, Markus, et al. "blue-c: a spatially immersive display and 3D video portal for telepresence." ACM Transactions on Graphics (TOG). vol. 22. No. 3. ACM, 2003.*
Chen, Shenchang Eric, "QuickTime VR—An Image-Based Approach to Virtual Environment Navigation," ACM, 1995, pp. 29-38.
Endo et al., "Image-Based Walk-Through System for Large-Scale Scenes," in the 4th International Conference on Virtual Systems and MultiMedia, 1998, 6 pages.
Hirose, Michitaka, "Image-Based Virtual World Generation," IEEE MultiMedia, Jan.-Mar. 1997, pp. 27-33.
"CAVE-MPlayer," http://persephone.cps.unizar.es/~spd/employer/, Nov. 12, 2007, 4 pages.
Naimark, Michael, "A 3D Moviemap and a 3D Panorama," Society of Photo-Optical Instrumentation Engineers Proceedings, vol. 3012, San Jose, CA, 1997, 11 pages.
Yee, Frank, "GPS & Video Data Collection in Los Angeles County," IEEE, 1994, pp. 388-393.
"Sometimes eight screens are better than one," Google Lat Long Blog, Dec. 7, 2009, 4 pages.

* cited by examiner

*Primary Examiner* — Ke Xiao
*Assistant Examiner* — Sarah Le
(74) *Attorney, Agent, or Firm* — Dority & Manning, P.A.

(57) ABSTRACT

Embodiments relate to a method for synchronizing media playback across multiple computing devices on a network. Multiple display screens, each coupled to a computing device, can be arranged in a circular formation surrounding a user. For example, a special enclosure for the display screens may be constructed for this purpose. An immersive viewing experience is created for the user by synchronizing the views displayed on each screen. The multiple screens operate in unison to create a tiled view of a three-dimensional environment. This immersive experience can be referred to as a "Liquid Galaxy." The experience is enhanced by allowing the user to view and navigate through such three-dimensional environments using an input device, such as, for example, a joystick or game controller.

20 Claims, 8 Drawing Sheets

REAL-TIME VIEW SYNCHRONIZATION ACROSS MULTIPLE NETWORKED DEVICES

CROSS REFERENCE TO RELATED APPLICATIONS

The present application claims the benefit of U.S. Provisional Patent Application No. 61/348,586, filed on May 26, 2010, entitled "Real-Time View Synchronization Across Multiple Networked Devices" by Jason Holt and Daniel Barcay, which is incorporated herein by reference in its entirety.

BACKGROUND

1. Field

Embodiments relate generally to the field of real-time digital media systems.

2. Background

The emergence and advancement of digital media production, including video game production, now allows users to experience viewing digital media content that mimics real life to a high level of detail. The use of enhanced three-dimensional imagery including three-dimensional computer-generated models to imitate physical objects in the real-world further enhances this experience. In addition, specialized imaging equipment with multiple cameras arranged in a rosette formation may be used to capture 360-degree panoramic imagery, including photos and video, of actual real-world scenery from different geographic locations. The combination of such imagery and modern computer technology can be used to create an immersive and interactive virtual environment that simulates the real world or other environments.

A user generally views digital media content using a computing device such as, for example, a personal computer or video game console, coupled to a display screen. The computing device executes an application to process the digital media content and display the content using the display screen. For example, the computing device may execute a digital media player to play video or execute video game software to process video games and display the content of the video or video game on the display screen.

A single computing device coupled to a single display screen is typically used to process and display digital content. Thus, the immersive experience for the user is limited by the number of display screens. Video wall systems have been constructed using multiple display screens that are tiled together to form one flat display screen. However, conventional video walls pose difficulties with accurately displaying different views of certain types of digital content, such as, for example, 360-degree panoramic imagery of real-world scenes. In addition, video walls generally require specialized controller devices to synchronize the multiple display screens.

Systems exist to capture and play videos of panoramic scenes using multiple cameras and multiple screens to play video corresponding to each camera, such as, for example, the Circle-Vision 360 system from The Walt Disney Company. However, such systems rely on independent devices, such as film projectors, that must be mechanically started at the same time. Despite being initially synchronized, independent systems always exhibit some kind of drift over time because of the dissimilarities in the timing mechanisms between the devices. It may be possible to mitigate drifting effects by shortening the duration of the experience, using devices that have relatively low drift-rate, or providing some kind of direct mechanical interlink between the devices. However, for long-form content or arbitrarily long digital experiences, even slight drift between independent systems can, over time, lead to disorienting asynchrony between the displays, which are meant to be components of a larger unified experience. For interactive experiences, such as allowing the user to rewind/play a movie or move a virtual camera around a three-dimensional world, the drift problem becomes even more complex, and a real-time synchronization mechanism becomes increasingly necessary.

Multiple display screens are frequently used with general purpose computing devices to view computer-generated environments, such as in video games. However, the processing power and the number of display ports of the computing device limit the number of display screens that can effectively display such content. It may be possible to compensate for such a limitation by increasing the processing power of the computing device and the number of display ports. However, such a computing device would require specialized hardware for this purpose and consequently, be relatively expensive to produce or purchase for most users. In addition, users would not be able to utilize general purpose computing devices they may already own.

Therefore, users need a capability for viewing any type of digital media content, including three-dimensional computer-generated environments and digital imagery of real-world scenes, using multiple screens that are synchronized so as to create a seamless, immersive experience. These users also need a capability for viewing such digital media content in an immersive way that does not require computing devices with specialized hardware. Further, developers of such interactive distributed display systems need a capability to maintain synchrony between the independent computing devices running independent software.

BRIEF SUMMARY

Embodiments relate to real-time synchronization of views across a plurality of computing devices coupled to a plurality of displays on a network. In one embodiment, a method for real-time synchronization of views across a plurality of computing devices coupled to a plurality of displays on a network is provided. The plurality of displays coupled to the plurality of computing devices are arranged in a formation around a common point to partially or fully surround a user. A view synchronization message is sent from a master device of the plurality of computing devices, the view synchronization message corresponding to a master view of media content. The master view is displayed using a master display, of the plurality of displays, coupled to the master device. The view synchronization message from the master device is received at one or more slave devices of the plurality of computing devices. One or more slave views of the media content is adjusted based on the received view-synchronization message and a position of each of one or more slave displays in the formation relative to a position of the master display in the formation. Then, the one or more secondary views of the media content are displayed using the one or more slave displays, of the plurality of displays, coupled to the one or more slave devices.

In another embodiment, a system for real-time synchronization of views across a plurality of computing devices coupled to a plurality of displays on a network, the plurality of displays arranged in a formation around a common point to partially or fully surround a user, comprises: a master device, of the plurality of computing devices, to send a view synchronization message, the view synchronization message corresponding to a master view of media content; a master display, coupled to the master device, to display the master view; and one or more slave devices, of the plurality of computing devices, to receive the view synchronization message from the master device, the one or more slave devices coupled to one or more slave displays of the plurality of displays, and to adjust one or more slave views of the media content based on the received view-synchronization message and a position of each of the one or more slave displays in the formation relative to a position of the master display in the formation, wherein the one or more slave displays are configured to display the one or more secondary views of the media content.

Embodiments may be implemented using hardware, firmware, software, or a combination thereof and may be implemented in one or more computer systems or other processing systems.

Further embodiments, features, and advantages of the present invention, as well as the structure and operation of the various embodiments, are described in detail below with reference to the accompanying drawings. It is noted that the invention is not limited to the specific embodiments described herein. Such embodiments are presented herein for illustrative purposes only. Additional embodiments will be apparent to persons skilled in the relevant art(s) based on the information contained herein.

BRIEF DESCRIPTION OF THE DRAWINGS/FIGURES

Embodiments are described, by way of example only, with reference to the accompanying drawings. In the drawings, like reference numbers may indicate identical or functionally similar elements. The drawing in which an element first appears is typically indicated by the leftmost digit or digits in the corresponding reference number. Further, the accompanying drawings, which are incorporated herein and form part of the specification, illustrate the embodiments of present invention and, together with the description, further serve to explain the principles of the invention and to enable a person skilled in the relevant art(s) to make and use the invention.

DETAILED DESCRIPTION

Figure 1:
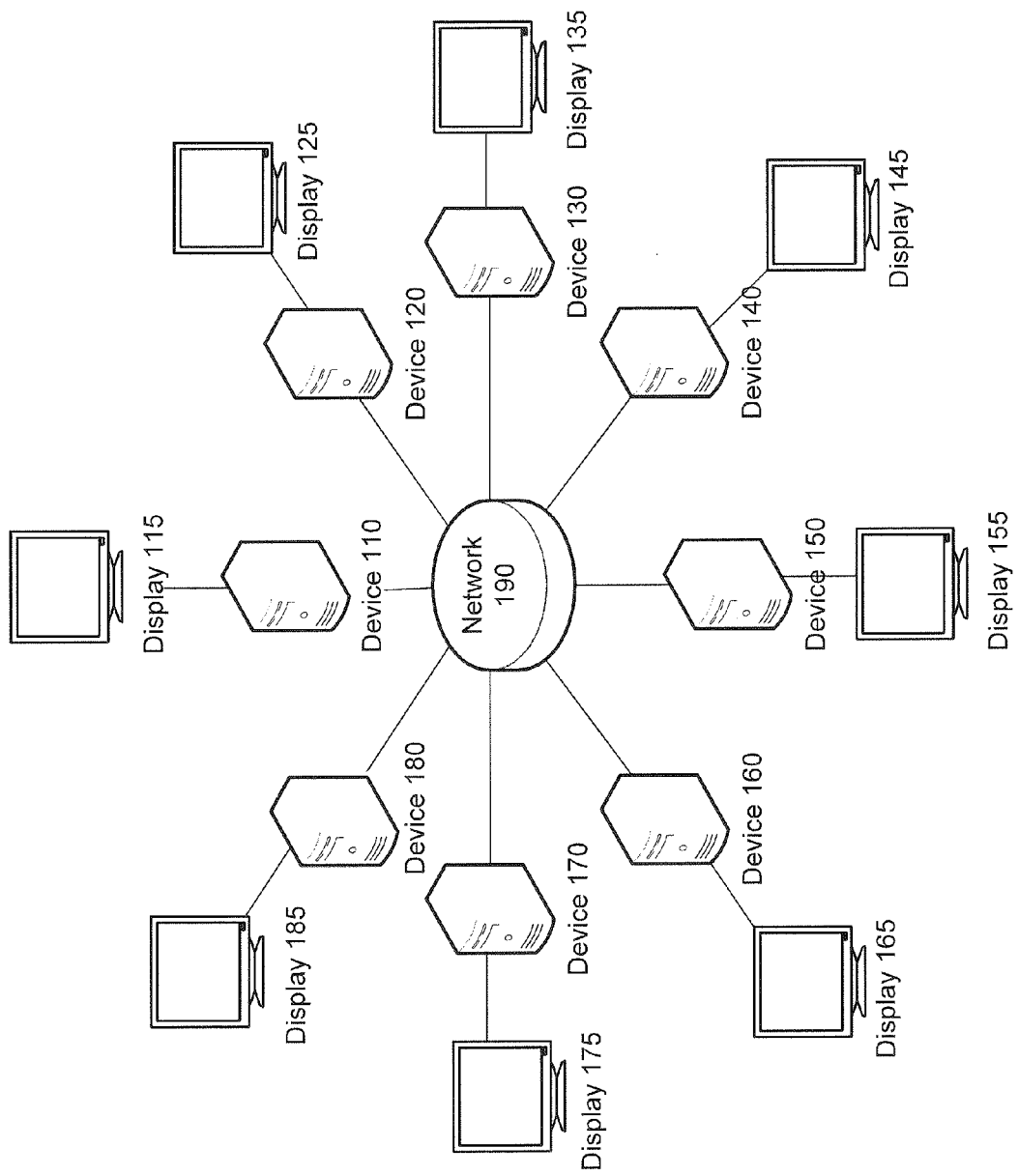
FIG. 1 is a diagram of an exemplary system suitable for practicing an embodiment.

Embodiments relate to synchronizing digital media playback, including video of real-world scenes and computer-generated three-dimensional graphics, across multiple computing devices on a network. Multiple display screens, each coupled to a computing device, can be arranged in a circular or polygonal formation to either fully or partially surround a user. For example, as described in further detail below with respect to FIG. 7, a special enclosure for the display screens may be constructed for this purpose. The multiple screens operate in unison to create a tiled view of three-dimensional environments, including virtual three-dimensional environments (e.g., in video games) and real three-dimensional environments (e.g., panoramic video). An immersive viewing experience is created for the user by synchronizing the views displayed on each screen in order to create a seamless three-dimensional landscape. For example, the views displayed by the display screens are rotated in real-time with respect to the display screen's position in the arrangement or formation. The experience is enhanced by allowing the user to interact with the three-dimensional environments displayed by the screens by using an input device, such as, for example, a joystick, game controller, or mouse. This immersive experience may be referred to as a "Liquid Galaxy."

While the present invention is described herein with reference to illustrative embodiments for particular applications, it should be understood that embodiments are not limited thereto. Other embodiments are possible, and modifications can be made to the embodiments within the spirit and scope of the teachings herein and additional fields in which the embodiments would be of significant utility. Further, when a particular feature, structure, or characteristic is described in connection with an embodiment, it is submitted that it is within the knowledge of one skilled in the relevant art to effect such feature, structure, or characteristic in connection with other embodiments whether or not explicitly described.

It would also be apparent to one of skill in the relevant art that the embodiments, as described herein, can be implemented in many different embodiments of software, hardware, firmware, and/or the entities illustrated in the figures. Any actual software code with the specialized control of hardware to implement embodiments is not limiting of the detailed description. Thus, the operational behavior of embodiments will be described with the understanding that modifications and variations of the embodiments are possible, given the level of detail presented herein.

In the detailed description herein, references to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

The terms "display" and "display screen" are used herein interchangeably to refer broadly and inclusively to any type of display for displaying and viewing digital media frames, including, but not limited to, video frames of real-world scenes and computer-generated digital graphics of, for example, a video game. Such displays can include, but are not limited to, cathode ray tube (CRT) monitors, liquid crystal display (LCD) screens, plasma display screens, projection screens, or other types of displays for viewing digital media content.

Table of Contents
I. System for View-Synchronization
II. Computing Device for View-Synchronization
    A. Master or Message-Sender Mode
    B. Slave or Message-Receiver Mode
III. Method
    A. Sending View-Synchronization Messages
    B. Receiving View-Synchronization Messages
IV. Example of Integrating View-Synchronization in GIS Systems
V. Example Computer System Implementation
VI. Variations
    A. Graphical User Interface Extensions
    B. Head-Tracking
VII. Conclusion

I. SYSTEM FOR VIEW-SYNCHRONIZATION

FIG. 1 is a diagram of an exemplary system 100 suitable for practicing an embodiment. In the example shown in FIG. 1, system 100 includes a device 110 coupled to a display 115, a device 120 coupled to a display 125, a device 130 coupled to a display 135, a device 140 coupled to a display 145, a device 150 coupled to a display 155, a device 160 coupled to a display 165, a device 170 coupled to a display 175, a device 180 coupled to a display 185, and a network 190. Devices 110, 120, 130, 140, 150, 160, 170, and 180 are each coupled to network 190 via a communications interface of each device. In addition, the devices are communicatively coupled to each other via network 190.

Network 190 can be any network or combination of networks that can carry data communication, and may be referred to herein as a data network. Such network 120 can include, but is not limited to, a wired (e.g., Ethernet) or a wireless (e.g., Wi-Fi and 3G) network. In addition, network 190 can include, but is not limited to, a local area network, medium area network, and/or wide area network such as the Internet. Network 190 can support protocols and technology including, but not limited to, Internet or World Wide Web protocols and/or services. Intermediate network routers, gateways, or servers may be provided between components of system 100 depending upon a particular application or environment.

Although only devices 110, 120, 130, 140, 150, 160, 170, and 180 are shown, additional devices may be used as necessary. Similarly, although only displays 115, 125, 135, 145, 155, 165, 175, and 185 are shown, additional displays may be used as necessary. Furthermore, the number of devices and displays may be fewer than shown in FIG. 1 as long as there are at least two devices and each device is coupled to at least one display.

Devices 110, 120, 130, 140, 150, 160, 170, and 180 can be any type of computing device having one or more processors, a user input (for example, a joystick, a mouse, QWERTY keyboard, touch-screen, microphone, or a T9 keyboard), and a communications interface capable of receiving and transmitting data over a network. Such computing devices can include, but are not limited to, mobile phones, personal digital assistants (PDAs), computers, clusters of computers, set-top boxes, or other similar types of devices capable of processing instructions and receiving and transmitting data to and from humans and other computing devices. Displays 115, 125, 135, 145, 155, 165, 175, and 185 can be any type of display for displaying and viewing digital media frames, including, but not limited to, video frames and digital graphic image frames from, for example, a video game. Such displays can include, but are not limited to, cathode ray tube (CRT) monitors, liquid crystal display (LCD) screens, plasma display screens, projection screens, or other types of displays for viewing digital media content.

In general, system 100 operates as follows. Devices 110, 120, 130, 140, 150, 160, 170, and 180 are configured to draw or play media frames, including video frames of real-world scenes and computer-generated graphics frames (e.g., video game content), using displays 115, 125, 135, 145, 155, 165, 175, and 185, respectively. In an embodiment, devices 110, 120, 130, 140, 150, 160, 170, and 180 draw media frames from the perspective of a three-dimensional virtual camera (not shown), which also represents the viewpoint of a user who views the frame on displays 115, 125, 135, 145, 155, 165, 175, and 185, respectively. In an embodiment, each device stores a media file comprising the frames to be drawn within a local memory coupled to the device. Devices 110, 120, 130, 140, 150, 160, 170, and 180 operate together in a master-slave configuration in which one device is configured to operate as a master device and the other devices are configured to operate as slave devices. When drawing each media frame in a sequence of media frames (e.g., from a media file), the designated master device is configured to send a view-synchronization message to the designated slave devices over network 190. The view-synchronization message sent by the master comprises information pertaining to the frame to be drawn. The master device draws the frame using its respective display. The information corresponding to the frame being drawn by the master is extracted from the view-synchronization message by the slave devices. Each slave device then uses the extracted information to synchronize the drawing of its respective frame (using its respective display) with the frame being drawn by the master.

Figure 6C:
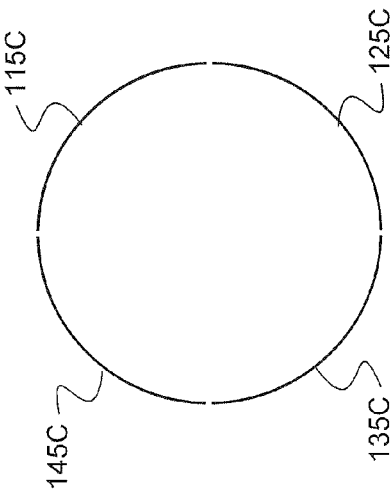
FIGS. 6A-6D illustrate exemplary arrangements of display screens in accordance with embodiments.
Figure 6B:
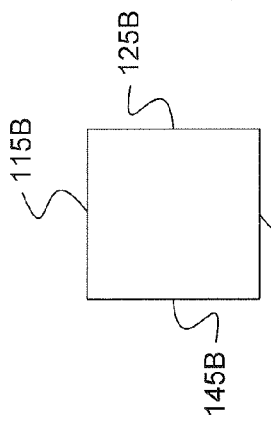
Figure 6D:
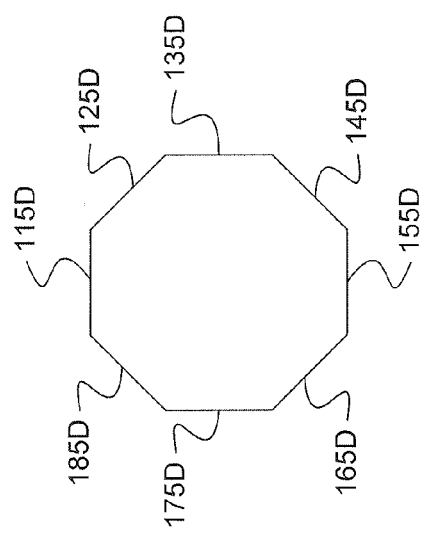
Figure 6A:
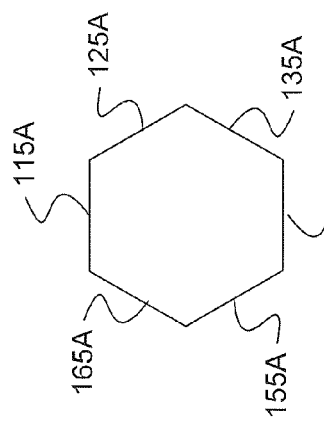

Further, displays 115, 125, 135, 145, 155, 165, 175, 185, or any combination thereof, can be arranged in a substantially circular or polygonal formation surrounding a common point, for example, a user (not shown) centrally located relative to the formation, in which the display area of each display is orthogonal to the user, i.e., directly faces the user with no tilt. FIGS. 6A, 6B, 6C, and 6D illustrate exemplary arrangements or formations of display screens in accordance with embodiments. For example, FIG. 6A illustrates an arrangement comprising displays 115A, 125A, 135A, 145A, 155A, and 165A in a hexagon formation. In another example, FIG. 6B illustrates an arrangement of four display screens in a square formation. Similarly, FIG. 6D illustrates eight display screens in an octagon formation, similar to the arrangement of the displays shown in system 100 of FIG. 1. In an embodiment, curved display screens can be used as illustrated in FIG. 6C, which illustrates four curved display screens arranged in a circular formation, as described above. The display screens of each configuration illustrated by FIGS. 6A-6D are assumed to be orthogonal to the user.

As will be described in further detail below, the views of the digital content (e.g., a real or virtual three-dimensional environment) of the media frame displayed on displays, arranged in any of formation, may be adjusted, in real-time, to correspond to each display's position in the arrangement or formation. Thus, displays illustrated in FIG. 1 and FIGS. 6A-D can be used to create a tiled display or wall, including a 360-degree tiled display, that acts like a single display by seamlessly displaying content of one or more frames simultaneously. One benefit of such an arrangement is increasing the immersive experience for the user viewing the displayed content.

Referring back to FIG. 1, in order to determine the appropriate viewing position to use, devices 110, 120, 130, 140, 150, 160, 170, and 180 operate in a master-slave configuration in which one device is configured to operate as a master device and the other devices are configured to operate as slave devices. The master device is configured to broadcast or send view-synchronization messages to the slave devices over network 190. The slave devices, in turn, are configured to receive the broadcasted view-synchronization messages from the master device and adjust their displayed views based on the received view-synchronization messages. For ease of explanation, device 110 will be designated herein to operate as the master or message-sender device and devices 120, 130, 140, 150, 160, 170, and 180 will be designated to operate as the slave or message-receiver devices. However, it should be noted that any of devices 110, 120, 130, 140, 150, 160, 170, and 180 may be configured to be either the master or the slave.

Thus, in an example using the above-described designations for master and slave devices in system 100, device 110 sends a view-synchronization message to each of devices 120, 130, 140, 150, 160, 170, and 180 over network 190. Device 110 sends a new view-synchronization message just prior to drawing each frame of a sequence of media frames, for example, of a media file stored at device 110. As will be described in further detail below, the view-synchronization message includes information corresponding to the media frame device 110 will draw. In an embodiment, such information may include, but is not limited to, time values corresponding to the time location of the frame in a media file that may be stored, for example, in local memory of the device 110. In an embodiment, such information may also include, but is not limited to, sequence numbers corresponding to each frame in a sequence of frames within the media file, viewpoint parameters, time parameters, feature content parameters, and/or other similar types of information related to the content of the frame.

Based on the received view-synchronization message, devices 120, 130, 140, 150, 160, 170, and 180 draw their respective media frames, as described above. In an embodiment, a separate media file comprising a sequence of media frames may also be stored at each of devices 110, 120, 130, 140, 150, 160, 170, and 180. In an embodiment, the stored media files are encoded or generated using the same parameters. In another embodiment, the frames and/or media file may be stored at a remote location accessible by devices 110, 120, 130, 140, 150, 160, 170, and 180 via a network 190. For example, the media file may be stored at a server (not shown), accessible by devices 110, 120, 130, 140, 150, 160, 170, and 180 over network 190. In addition, the server may stream frames of the media file across network 190 to each of devices 110, 120, 130, 140, 150, 160, 170, and 180.

In an example for drawing video frames of a video file, device 110 may determine each frame's time position and accordingly generate a new view-synchronization message for each frame. In this example, the view-synchronization message may include a time value corresponding to the determined time position of the frame to be drawn. Device 110 may send the generated view-synchronization message to devices 120, 130, 140, 150, 160, 170, and 180 via network 190 using, for example, a predetermined network address and communication port. Devices 120, 130, 140, 150, 160, 170, and 180 may be configured to receive the view-synchronization message at, for example, the predetermined communication address and port. In the example, devices 120, 130, 140, 150, 160, 170, and 180 may then extract the time value information from the received view-synchronization message and draw video frames that are also at the same time position in their respective video files as the frame drawn by device 110.

Although the above example describes video frames from a video file, it should be noted that embodiments are not limited thereto. In another example, the frames may be computer-generated frames corresponding to a video game file stored at each of devices 110, 120, 130, 140, 150, 160, 170, and 180. Thus, as will be described in further detail below, device 110 may generate and send a view-synchronization message based, in part, on the virtual camera parameters associated with the current frame to be drawn. Devices 120, 130, 140, 150, 160, 170, and 180 can then each adjust their own virtual cameras based on the view-synchronization message in order to draw a different view, as described above, of the media content (e.g., a three-dimensional virtual environment of the video game) using displays 125, 135, 145, 155, 165, 175, and 185, respectively.

It would be apparent to a person skilled in the relevant art given this description that any number of well-known communication protocols and routing schemes may be used to send messages between the master and slave devices over network 190. One example of such a protocol and routing scheme includes, but is not limited to, the user (or universal) datagram protocol (UDP) using broadcast messages. For example, using UDP communication, device 110 may broadcast a view-synchronization message, in the form of a UDP datagram, to a predetermined broadcast address, at which devices 120, 130, 140, 150, 160, 170, and 180 may use to receive the broadcasted message.

II. COMPUTING DEVICE FOR VIEW-SYNCHRONIZATION

Figure 2:
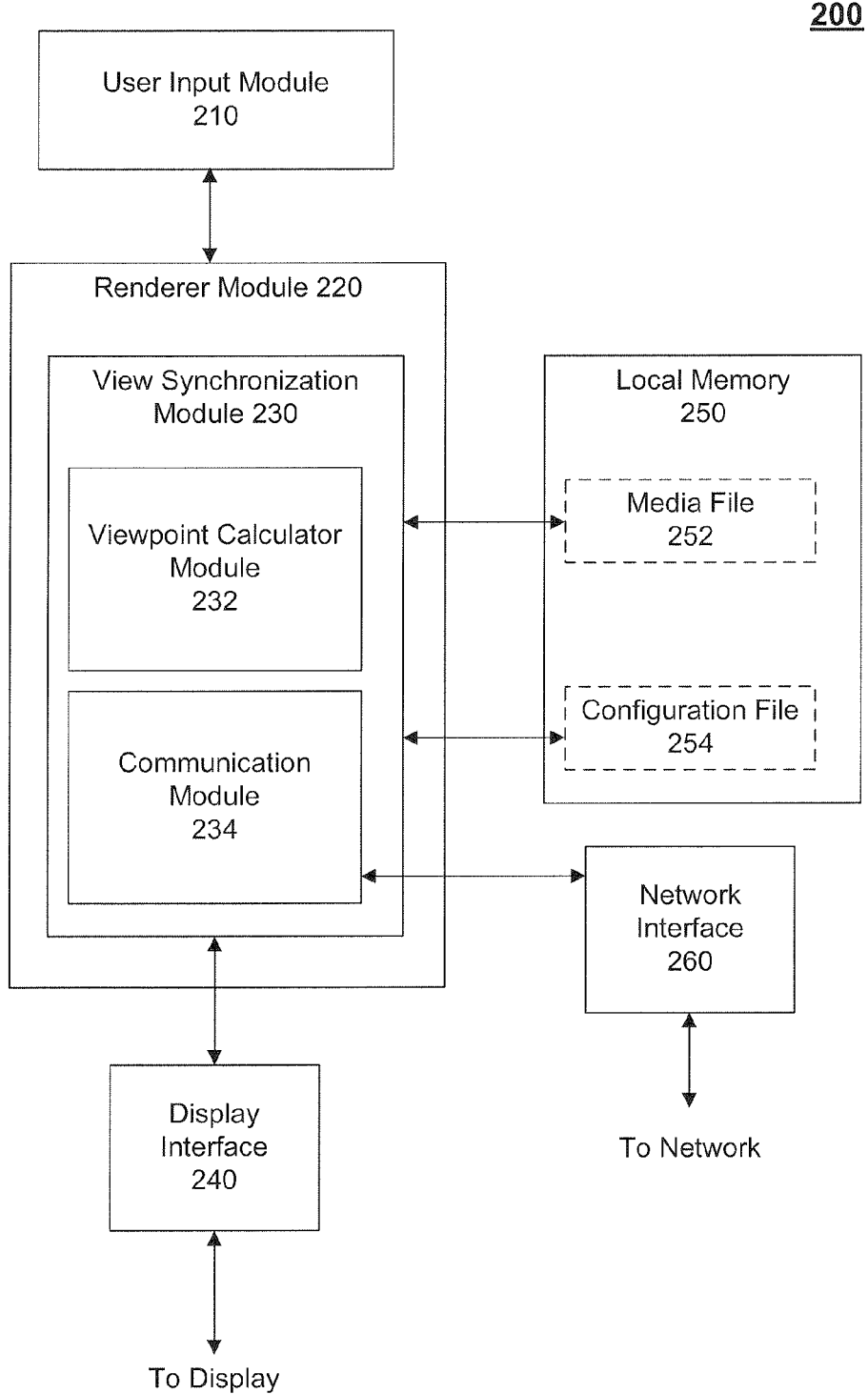
FIG. 2 is an architecture diagram of an exemplary device for synchronizing media playback over a network, according to an embodiment.

FIG. 2 is an architecture diagram of an exemplary device 200 for synchronizing media playback over a network according to an embodiment. For example, device 200 can be used to implement any of devices 110, 120, 130, 140, 150, 160, 170, and 180 of system 100 shown in FIG. 1. In an embodiment, device 200 includes user input module 210, renderer module 220, view synchronization module 230, viewpoint calculator 232, communication module 234, display interface 240, local memory 250, media file 252, configuration file 254, and network interface 260.

It would be apparent to a person skilled in the relevant art given this description that although not shown in FIG. 2, device 200 may include additional components, modules, and interfaces as may be necessary. In addition, user input module 210, renderer module 220, view synchronization module 230, viewpoint calculator 232, and communication module 234 represent functionality in implementing embodiments. One skilled in the art given this description will understand that, more or less modules than shown in device 200 may be implemented in software to achieve the functionality of present embodiments.

Device 200 executes renderer module 220, the operation of which is further described herein. In an embodiment, renderer module 220 may be implemented as a standalone application for drawing media frames, including video frames of real-world imagery and computer-generated imagery of three-dimensional virtual environments. In another embodiment, renderer module 220 may be implemented as a component of a client application (not shown) also executed by device 200 for drawing the media frames. Such standalone and/or client applications can include, but are not limited to, three-dimensional geographic information system (GIS) viewers (e.g., GOOGLE EARTH client application), digital video players, video game players, or other type of application for drawing or rendering digital imagery, including three-dimensional imagery, using a display, such as, for example, an LCD display screen.

In an embodiment, renderer module 220 is configured to draw media frames of a media file, such as, for example, media file 252. In an embodiment, media file 252 is stored in local memory 250. Local memory 250 may be any type of recording medium coupled to an integrated circuit that controls access to the recording medium. The recording medium can be, for example and without limitation, a semiconductor memory, a hard disk, or other similar type of memory or storage device. Further, local memory 250 may be integrated within device 200 or a stand-alone device communicatively coupled to device 200 via a direct connection. In another embodiment, media file 252 is stored at a remote storage location accessible by device 200 over a network, such as for example, network 190 of FIG. 1. For example, media file 252 may be stored at a remote server or database adapted to store, retrieve, and/or transmit digital media content over a network. In addition, the remote server and/or database may be communicatively coupled to device 200 over a network, such as network 190. As described in an example above, the frames of media file 252 may be streamed to device 200 over network 190. For example, the remote server may stream frames of the media file across network 190 to device 200, or alternatively, renderer module 220 may retrieve the frames by communicating with the remote server or database over network 190.

As described above, media file 252 can include, but is not limited to, digital video frames of real-world imagery and/or computer-generated frames of three-dimensional virtual environments, such as in a video game. The media frames drawn by renderer module 220 are output, via display interface 240, to a display coupled to device 200, such as, for example, any of displays 115, 125, 135, 145, 155, 165, 175, and 185 shown in system 100 of FIG. 1. A person skilled in the relevant art given this description would appreciate that any number of file formats may be used to store media file 252. Examples of video file formats include, but are not limited to, Moving Picture Experts Group (MPEG) format and Windows Media Video (WMV). However, embodiments are not limited to video file formats and can include video game file formats, computer graphics file formats, or any other type of file format for storing digital video and/or digital graphics content.

In an embodiment, renderer module 220 is coupled to user input module 210. User input module 210 is configured to receive user input from a user input device operated by a user (not shown). Such user input may be received from a user input device coupled to device 200. Example user input devices include, but are not limited to, a mouse, a joystick, a game controller, a QWERTY keyboard, touch-screen, microphone, a T9 keyboard, or any other user input device. User input module 210 sends user input to renderer module 220. As described in further detail below, the user input received by renderer module 220 may be used to vary the viewing position of the frame being drawn.

Renderer module 220 may be implemented by any type of computing device. Such a computing device can include, but is not limited to, a personal computer, mobile device such as a mobile phone, workstation, embedded system, game console, television, set-top box, or any other computing device. Further, a computing device can include, but is not limited to, a device having a processor and memory for executing and storing instructions. Software may include one or more applications and an operating system. Hardware can include, but is not limited to, a processor, memory and graphical user interface display. The computing device may also have multiple processors and multiple shared or separate memory components. For example, the computing device may be a clustered computing environment or server farm.

In an embodiment, renderer module 220 includes view synchronization module 230. In an embodiment, view synchronization module 230 includes viewpoint calculator module 232 and communication module 234. In an embodiment, device 200 can be configured to be a master device by configuring view synchronization module 230 to send messages to one or more slave devices, as described above. Alternatively, device 200 can be configured to be a slave by configuring view synchronization module 230 to receive messages from the master device, also as described above.

In an embodiment, device 200 can be configured to be both a master device and slave device at the same time. For example, device 200 (and view-synchronization module 230) may receive messages from a device that is designated as the master, and also, send these received messages to other slave devices. In an embodiment, device 200 may be communicatively coupled to multiple networks, each network comprising different sets of master and slave devices. For example, device 200 may be configured as a slave device for one network while being configured as a master device for a different network.

In an embodiment, configuration file 254 may be used to designate whether device 200 is a master, slave, or both. For example, device 200 may extract configuration information from configuration file 254 that device 200 can use to determine operation as a master or slave device. Accordingly, view synchronization module 230 can function in one of two operational modes: master (i.e., message-sender) mode to send view-synchronization messages or slave (i.e., message-recipient) mode to receive view-synchronization messages. In an embodiment, configuration file 254 may be stored in local memory 250. However, it would be apparent to a person skilled in the relevant art given this description that the use of configuration file 254 is optional and device 200 may be preconfigured to operate as either a master or a slave, or both.

A. Master or Message-Sender Mode

In an embodiment, view synchronization module 230 is configured to operate in master, or message-sender, mode. In this configuration, view synchronization module 230 sends view-synchronization messages to one or more slave devices over a network, such as, for example, network 190 of FIG. 1. In an embodiment, view synchronization module 230 uses communication module 234 to send the view-synchronization messages to slave devices, via network interface 260. Network interface 260 can be any type of communications interface that device 200 can use to send and receive communications via a network. In an embodiment, communication module 234 determines a network address and network communication port number to send view-synchronization messages, where the network address and port correspond to one or more of the slave devices on the network. A network communication port number, as would be apparent to a person skilled in the relevant art given this description, is generally used in combination with the network address to specify a communication endpoint in accordance with the particular communication protocol used for communication between devices. For example, communication module 234 may determine a single network address, such as, for example, a UDP broadcast address, and port that can be used to simultaneously broadcast the view-synchronization message as a datagram to all of the slave devices, as described above. Alternatively, communication module 234 may use a network address or hostname corresponding to each slave device connected to the network.

In an embodiment, configuration file 254 includes the network address and communication port information, which communication module 234 can retrieve to determine the network address and port for one or more slave devices. For example, configuration file 254 may include the broadcast address communication module 234 can use to broadcast view-synchronization message to all slave devices on the network simultaneously. In another example, configuration file 254 may include a list of IP addresses or hostnames corresponding to slave devices to which communication module 234 can send view-synchronization messages. As described above with respect to system 100 of FIG. 1, a person skilled in the relevant art given this description would recognize that any number of well-known communication protocols may be used to send messages from communication module 234 to other devices via a network, such as network 190.

In an embodiment, renderer module 220 invokes view synchronization module 230 just prior to drawing each frame of a sequence of media frames of media file 252. As described above, each view-synchronization message sent by a master device comprises information pertaining to the media frame to be drawn. In an embodiment, view synchronization module 230 uses viewpoint calculator module 232 to determine the information to be included in the view-synchronization message corresponding to the media frame to be drawn. Once viewpoint calculator module 232 determines the information associated with the frame to be drawn, as described in further detail below, viewpoint calculator module 232 includes the information in the view-synchronization message to be sent to the slave devices.

Viewpoint calculator module 232 can be configured to determine a number of different types of information corresponding to the frame to be drawn. In an embodiment, viewpoint calculator module 232 determines a time value or time code associated with the media frame. For example, each frame of media file 252 can include a time value or code that corresponds to the position of the frame in the sequence of frames as stored in media file 252. Thus, a position of a particular frame within the sequence of frames within media file 252 may be determined by using its respective time value or code.

In another embodiment, viewpoint calculator module 232 determines a sequence number that, like the time value or code, corresponds to the position of the frame in the sequence of frames as stored in media file 252. Such a sequence number can be, for example, a monotonically increasing integer value beginning with the integer value of one corresponding to the first frame in the sequence. For example, viewpoint calculator module 232 can store a sequence counter in, for example, local memory 250. Viewpoint calculator module 232 can then increment the sequence counter for each frame to be drawn. One benefit of using a sequence number for each frame is to track the frames between the master and slave devices in order to prevent out-of-order frames from being drawn.

For example, in UDP communication, view-synchronization messages may not always be delivered in proper order due to the nature of UDP communication. Thus, the sequence number of each view-synchronization message sent by the master helps to mitigate issues related to out-of-order messages by enabling the slave devices to ignore any message with an out-of-order (old) sequence number. Additional benefits of including such a sequence number with the view-synchronization message include: speed due to the fact that slave devices do not have to wait for subsequent messages to arrive and the master does not have to retry for dropped data packets; and robustness due to the fact that the master and slave devices will never get into a poor state by missing any messages. Any missed or dropped messages do not matter and the next successful message to be sent will return the devices to the proper synchronization state.

In an embodiment, renderer module 220 draws each media frame from the perspective of a three-dimensional virtual camera, as described above, which also represents the viewpoint of a user who views the frame on a display, such as, for example, an LCD display screen. Such a perspective may be defined by a three-dimensional view frustum such as, for example, a truncated three-dimensional pyramid. The view frustum represents the virtual camera's viewable content area within a three-dimensional space. Content information corresponding to the frame can be displayed at varying levels of details depending on its distance from the virtual camera. Such content information may comprise any type of digital media content including, but not limited to, imagery of real-world scenes captured from a video camera or computer-generated imagery, such as, for example, imagery of virtual scenes from a video game.

In an embodiment, the user can manipulate the user's viewpoint of the frustum using an input device, such as, for example, a joystick or track-pad, coupled to device 200. In an embodiment, user input module 210 receives the user input and sends it to renderer module 220. Based on the received user input from user input module 210, renderer module 220 changes, in real-time, the orientation and position of the frustum. Further description of the virtual camera and its operation for displaying view frustums can be found in commonly owned U.S. patent application Ser. No. 12/129,520 and U.S. patent application Ser. No. 12/423,434, which are both incorporated by reference herein in their entirety.

Further, renderer module 220 uses a model-view matrix (or simply "view matrix") to specify the position and orientation of objects within the viewable content area with respect to the virtual camera. For example, the objects may be digital models of objects within a scene represented in a frame. The virtual camera also has a position and orientation in three-dimensional space that is used as a reference point to create the view matrix that will be applied to the models or objects in the scene. The view matrix translates and rotates objects to place them in three-dimensional space relative to the virtual camera, where the camera is at the origin. A person skilled in the relevant art given this detailed description would appreciate that any of a number of various ways can be used to create a view matrix for a media frame.

In an embodiment, viewpoint calculator module 232 determines parameters of the virtual camera from the model-view matrix of the current frame to be drawn. Such camera parameters generally specify the position and orientation of the virtual camera in three-dimensional space. Such parameters can include, but are not limited to, directional coordinates, (e.g., latitude, longitude, north, south, in-between), altitude and pitch/tilt (e.g., level, down, up, in-between), yaw/roll (e.g., level, tilt clockwise, tilt counter-clockwise, in-between), horizontal field of view, and vertical field of view. As will be described in further detail with respect to geographic information systems (GIS) below, further embodiments of viewpoint calculator module 232 can be used to determine additional information associated with the current frame including, but not limited to, active content features to be rendered and layers of content-specific descriptive information to be drawn.

In an embodiment, viewpoint calculator module 232 uses the determined information corresponding to the current frame to be drawn, as described above, to generate a view-synchronization message. It would be apparent to a person skilled in the relevant art given this description that the generated view-synchronization message may comprise any of a number of well-known formats depending on the type of information included. For example, the view-synchronization message may be formatted as a single numerical value corresponding to, for example, the time value or code of the current frame. In another example, the view-synchronization message may be formatted as a string of numerical values corresponding to, for example, a sequence number and camera parameters.

In an embodiment, the view-synchronization message generated by viewpoint calculator module 232 may not only include information pertaining to the content of a frame to be drawn but also the content itself. For example, various content features (e.g., roads, borders, labels, etc.) in a frame may be activated or inactivated. If such features are activated on the frame drawn by the master, this activation information can be included in the view-synchronization message to the slave devices to ensure the frame drawn by the slave devices matches the content drawn by the master. In an embodiment, viewpoint calculator module 232 can be configured to include the content itself, in addition to activation information for the content, within the generated view-synchronization message.

Once viewpoint calculator module 232 generates the view-synchronization message using the determined view-synchronization information associated with the current frame to be drawn, communication module 234 sends the generated message using the determined network address and communication, as described above. Also as described above, after communication module 234 sends the view-synchronization message, renderer module 220 draws the frame using display interface 240. In an embodiment, view synchronization module 230 is configured to determine if all frames of a sequence of media frames in media file 252 have been drawn. In an embodiment, if view synchronization module 230 determines that all frames have been drawn, communication module 234 may send a message to exit or stop, using the same network address and communication port to the slave devices. For example, communication module 234 may send a message comprising an "exit" string identifier that when received by slave devices causes them to exit or stop drawing or attempting to draw media frames. In an embodiment, user input module 210 may receive an exit or quit command initiated by the user via an input device coupled to device 200, as described above. Communication module 234 can then send the same exit message to the slave devices in response to the received exit command from the user.

B. Slave or Message-Receiver Mode

In an embodiment, view synchronization module 230 is configured to operate in slave, or message-receiver, mode. In this configuration, view synchronization module 230 receives synchronization messages from a master device over a network, such as, for example, network 190 of FIG. 1. In an embodiment, communication module 234 continuously polls or checks its respective network communication port for view-synchronization messages. In an embodiment, the network communication port is specified in configuration file 254, as described above. In an embodiment, once a view-synchronization message is received by communication module 234 at the specified network communication port, viewpoint calculator module extracts view-synchronization information from the received view-synchronization message. The view-synchronization information corresponds to the next frame to be drawn, as described above. Also as described above, the received view-synchronization message may include an exit command. In response to receiving the exit command, view synchronization module 230 can relay the exit command to renderer module 220, according to an embodiment. For example, upon receiving an exit command from view synchronization module 230, renderer module 220 exits and discontinues drawing frames.

As described above, the received view-synchronization message may comprise various types of information corresponding to the frame to be drawn. In an embodiment, the view-synchronization message includes a time value corresponding to a time position of the media frame to be drawn by the master device, as described above. In an embodiment, viewpoint calculator module 232 extracts the time value from the view-synchronization message. View synchronization module 230 then sends a request to renderer module 220 to draw the next frame based on the extracted information from the view-synchronization message. For example, the request to renderer module 220 may include the time value of the frame to be drawn. It would be apparent to a person skilled in the relevant art given this description that other aspects of such a request would depend on the specific renderer module or rendering application used to draw the frame. Upon receiving the request from viewpoint calculator module 232, renderer module 220 draws the frame in accordance with the request, i.e., the view-synchronization information derived from the view-synchronization message. In an embodiment, renderer module 220 draws the particular media frame located at the time position within the sequence of media frames (e.g., included in media file 252) as specified by the time value in the request from viewpoint calculator module 232.

In another embodiment, view synchronization message may comprise camera parameters associated with a virtual camera, as described above. In an embodiment, viewpoint calculator module 232 extracts the camera parameters from the view synchronization message. For example, the extracted camera parameters may include, but are not limited to, latitude, longitude, altitude, pitch, yaw, roll, field of view, or any combination thereof. The extracted camera parameters correspond to the parameters of the virtual camera of the designated master device. In an embodiment, viewpoint calculator module 232 uses the extracted camera parameters to determine the appropriate position and orientation for its own virtual camera, i.e., the virtual camera corresponding to the display coupled to device 200 configured to be a slave or message-receiver.

In an embodiment, display screens are physically arranged in a substantially circular or polygonal pattern, as described above with respect to FIGS. 6A-6D, to surround the user. As described above, each display screen is coupled to either a master device or a slave device. Also as described above, the master device determines the frame to be drawn while each slave device draws its respective frame based on the frame drawn by the master device. For example, device 200 may be configured to be a slave device that is coupled to one of several display screens surrounding the user. As described above, the content displayed on each display screen may be from the perspective of a virtual camera.

In an embodiment, viewpoint calculator module 232 uses camera position settings stored, for example, in configuration file 254 in combination with the camera parameters extracted from the view synchronization message to determine the appropriate position and orientation for its own virtual camera in the circular arrangement of display screens coupled to master and slave devices. Such camera position settings may include, but are not limited to, horizontal and vertical field of view, yaw, pitch, and roll offset settings. In an embodiment, viewpoint calculator module 232 uses the camera position settings to account for the physical offset of the display screen coupled to device 200 (e.g., as a slave device) from the physical location of the display screen coupled to the master device in such an arrangement. Further, viewpoint calculator module 232 can apply the extracted camera parameters with the camera position settings to rotate its virtual camera accordingly.

Applying these rotations, viewpoint calculator module 232 thereby derives the appropriate camera position for its virtual camera relative to the surrounding arrangement of display screens. In an embodiment, viewpoint calculator module 232 converts the derived camera position into a new model-view matrix, as described above, which viewpoint calculator module 232 can then send to renderer module 220 along with the request to draw the frame based on the new model-view matrix. The frame drawn by renderer module 220 represents a view of the content of the frame based on the model-view matrix generated from the derived camera position. Thus, the offset settings allow each slave device, including, for example, device 200, to display a different view of the frame to be drawn, appropriately offset from the view of the frame drawn by the master device.

Each device draws its view of the frame using a display screen coupled to the device. For example, the multiple display screens may be placed adjacent to each other, i.e., tiled together, to form one large display screen. In an embodiment, the view drawn by each device coupled to the surrounding arrangement of display screens is a different portion of a view frustum, as described above, thereby resulting in a tiled 360-degree view of the displayed content. In an embodiment, configuration file 254 includes the portion of the view frustum to be drawn and viewpoint calculator module 220 uses configuration file 254 to determine the portion of the view frustum to draw. Further, viewpoint calculator module 232 transforms the view frustum using the current model-view matrix generated from the derived camera position, as described above. Viewpoint calculator module 220 can then send a request to renderer module 220 to draw the current frame based the appropriate portion of the view frustum as transformed by the model-view matrix. Thus, the views presented by the master and slave devices are seamlessly rotated 360 degrees around the user to give the user an illusion of looking out multiple windows into the virtual world represented by the content displayed on each display screen.

III. METHOD

A. Sending View-Synchronization Messages

Figure 3:
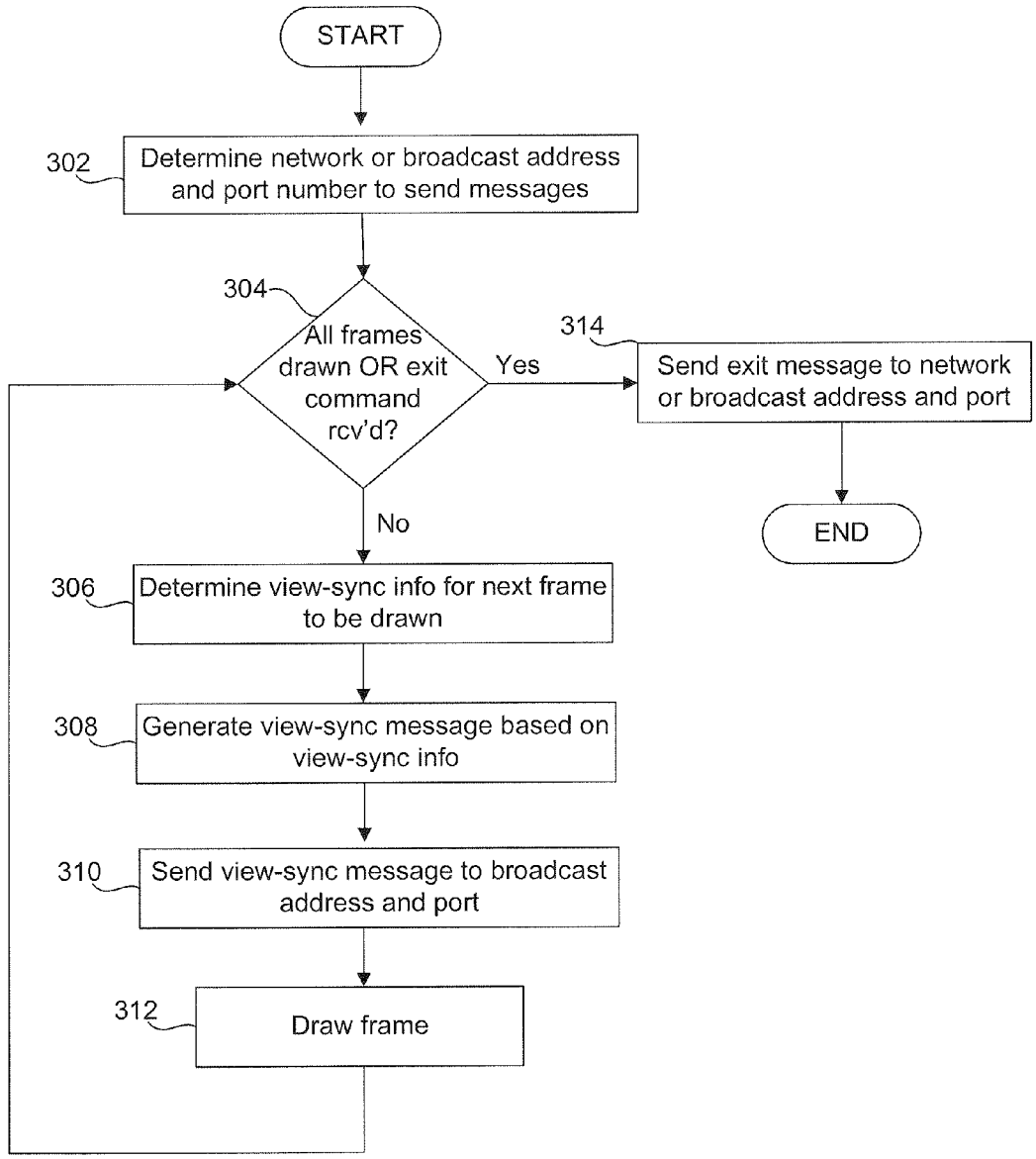
FIG. 3 is a process flowchart of an exemplary method for sending view-synchronization messages over a network, according to an embodiment.

FIG. 3 is a process flowchart of a method 300 of an exemplary method for sending view-synchronization messages from a master or message-sender device over a network, such as, for example, network 190. Method 300 includes steps 302, 304, 306, 308, 310, 312, and 314. For ease of explanation, system 100 of FIG. 1, as described above, will be used to describe method 300, but is not intended to be limited thereto. Further, for ease of explanation, method 300 will be described in the context of device 200 of FIG. 2, configured to be a master or message-sender device, as described above. Based on the description herein, a person of ordinary skill in the relevant art will recognize that method 300 can be executed on any type of computing device (e.g., device 200) capable of transmitting communications over a network to one or more other computing devices and further capable of drawing or rendering digital media frames using a display screen.

Method 300 begins in step 302, in which a network address and communication port number, which can be used to send messages, is determined. For example, the network address can be a broadcast address used in UDP communication from a master device to all slave devices simultaneously, as described above. Step 302 may be performed, for example, by communication module 234 of FIG. 2. In an embodiment, a configuration file (e.g., configuration file 254) can be used to store the appropriate network address and port numbers corresponding to one or more slave devices on the network, as described above. One benefit of using such a configuration file is that it provides an alternative to UDP broadcasting, which may be unreliable for ensuring message delivery. Once the appropriate network address(es) and port number(s) are determined, method 300 proceeds to step 304, which includes determining whether either all frames in a sequence of frames have been drawn or an exit command has been received from a user. The sequence of frames may be from a media file stored in either local memory or retrieved from a remote storage location, such as, for example, media file 252 of FIG. 2. The user may input an exit command via a user input device (e.g., a joystick, controller, keyboard, or mouse) coupled to the master device. Step 304 may be performed, for example, by view synchronization module 230 in addition to user input module 210, which directs the user input to view synchronization module 230.

If, in step 304, it is determined that all frames have been drawn or that an exit command has been received from the user, then method 300 proceeds to step 314, which includes sending an exit message to the network address (e.g., UDP broadcast address) and port determined in step 302. The exit message is sent to the slave devices over a network (e.g., network 190 of FIG. 1). The exit message can be any type of message or command that directs the slave devices to discontinue drawing frames. Step 314 may be performed, for example, by communication module 234. Alternatively, in step 304, it may be determined that all frames have not been drawn and no exit command has been received via user input, in which case method 300 proceeds to step 306. Step 306 includes determining view-synchronization information corresponding to the next frame to be drawn in the sequence of frames that compose, for example, media file 252. The view-synchronization information may include various information pertaining to the frame to be drawn, as described above. In an embodiment, the view-synchronization message includes camera parameters of a virtual camera, as described above. For example, the view-synchronization information may be determined from the current model-view matrix of the current frame to be drawn from the perspective of the virtual camera, as described above. Step 306 may be performed, for example, by viewpoint calculator module 232.

After the view-synchronization information corresponding to the frame is determined, method 300 proceeds to step 308, which includes generating a view-synchronization message based on the determined view-synchronization information, as described above. Step 308 may be performed, for example, by viewpoint calculator module 232. In step 310, the generated view-synchronization message is sent to the determined network or broadcast address(es) and port number(s) determined in step 302. As mentioned previously, a different network address (or hostname) and port combination may be listed for each slave device on the network. In an embodiment, a list of network addresses (or hostnames) and port numbers may be stored in a configuration file, such as, for example, configuration file 254. The configuration file may be stored and retrieved from local memory (e.g., local memory 150) of the master device. Alternatively, a single broadcast address and port number may be used to send the view-synchronization message to all slave devices on the network at the same time. This broadcast address and port may also be stored in the configuration file, according to an embodiment. Step 310 may be performed, for example, by communication module 234.

Once the view-synchronization message has been sent, method 300 proceeds to step 312, which includes drawing the current frame. The frame may then be displayed on a display, such as, for example, display 115 of FIG. 1. In an embodiment, the frame is drawn from the perspective of the virtual camera previously mentioned. Further, only a first portion of a view frustum may be drawn. The slave devices draw the remaining portions of the view frustum so as to create a tiled view of the view frustum across multiple display screens physically arranged to be adjacent to one another (e.g., in a circular or polygonal formation surrounding the user, as described above). The displays work in unison to create a tiled video wall, as described above. In addition, each portion of the view frustum is appropriately transformed according to the model-view matrix, accounting for the position and orientation of the virtual camera. Step 312 may be performed, for example, by renderer module 220 and view synchronization module 230 (e.g., renderer module 220 draws the frame based on a request from view synchronization module 230).

After step 312, method 300 loops back to step 304, in order to once again determine whether all frames have been drawn or whether an exit command has been input by the user, as described above. Method 300 concludes after step 314, once the exit message has been sent to the slave devices using the appropriate network addresses or broadcast address and port number(s).

B. Receiving View-Synchronization Messages

Figure 4:
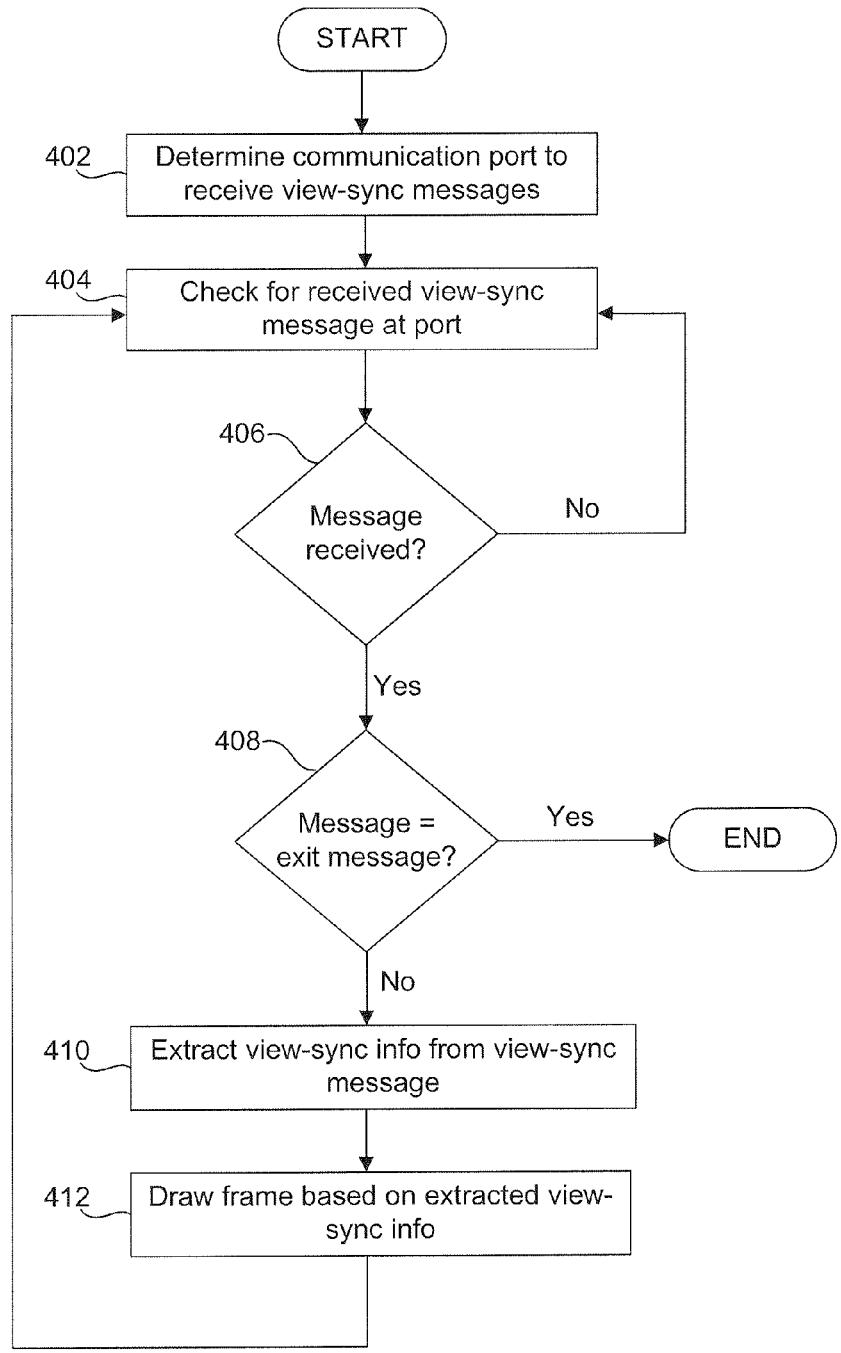
FIG. 4 is a process flowchart of an exemplary method for receiving view-synchronization messages over a network, according to an embodiment.

FIG. 4 is a process flowchart of a method 400 of an exemplary method for receiving view-synchronization messages at a slave or message-receiver device over a network, such as, for example, network 190. Method 400 includes steps 402, 404, 406, 408, 410, and 412. For ease of explanation, system 100 of FIG. 1, as described above, will be used to describe method 400, but is not intended to be limited thereto. Further, for ease of explanation, method 400 will be described in the context of device 200 of FIG. 2, configured to be a slave or message-receiver device, as described above. Based on the description herein, a person of ordinary skill in the relevant art will recognize that method 400 can be executed on any type of computing device (e.g., device 200) capable of receiving communications over a network and further capable of drawing or rendering digital media frames using a display screen.

Method 400 begins in step 402, which includes determining a communication port to receive view-synchronization messages sent from a master or message-sender device, as described above. In step 404, the port is checked or polled repeatedly for received view-synchronization messages. Steps 402 and 404 may be performed, for example, by communication module 234. Once a message is received in step 406, method 400 proceeds to step 408, which includes determining whether the received message is a message to exit or stop drawing frames, as described above. If the message is an exit message, method 400 concludes. Step 408 may be performed, for example, by view synchronization module 230 or by any of its component modules including viewpoint calculator module 232 and communication module 234.

Upon determining that a view-synchronization message has been received, method 400 proceeds to step 410, which includes extracting view-synchronization information from the view-synchronization message. Step 410 may be performed, for example, by viewpoint calculator module 232. In step 412, the frame is drawn based on the extracted view-synchronization information. Step 412 may be performed, for example, by renderer module 220 based on a request comprising the view-synchronization information from viewpoint calculator module 232, as described above.

The view-synchronization information can include various types of information, as described above, related to the current frame to be drawn. In an embodiment, includes camera parameters of a virtual camera. The extracted camera parameters correspond to the parameters of the virtual camera of the master device. The extracted camera parameters can be used to determine the appropriate position and orientation for the virtual camera of the slave or message-receiver device. In addition, various camera position settings (e.g., horizontal field of view, yaw, pitch, and roll offset settings) can be used in combination with the extracted camera parameters to determine the virtual camera's position and orientation for drawing the frame. Further, as described above, only a portion of a view frustum may be drawn. The camera position settings and the portion of the view frustum to draw may be included in a configuration file (e.g., configuration file 254). The determined camera position and orientation can then be converted into a new model-view matrix used to draw the current frame. As described above, the model-view matrix can be used to transform the view frustum with respect to the display screen's physical location relative to the display screen coupled to the master device.

For example, two display screens (e.g., displays 115B and 125B of FIG. 6B), may be arranged in a two-display formation in which the first display (e.g., display 115B) may be positioned in front of the user while the second display (e.g., display 125B) may be positioned to the right of the user, who is centrally located with respect to both displays. Since both displays are orthogonal to the user, the display areas used to display content directly point in the direction of the user. Thus, second display, located to the right of the user, may be "yawed" by 90 degrees with respect to the first display in front of the user, and the virtual camera in the three-dimensional landscape displayed on the second display would also be yawed by 90 degrees in order to provide the illusion of a seamless landscape. Thus, the view displayed by each display is rotated with respect to its position in the arrangement in order to create a seamless landscape of the displayed three-dimensional environment. In another example of a two-display configuration, a first display may be located in front of the user, as in the previous example, while a second display may be positioned directly above the user, pointing downwards. In this example, the virtual camera in the three-dimensional landscape displayed on the second display would have to be "pitched" by 90 degrees to match the physical position of the second display relative to the first display.

Figure 8:
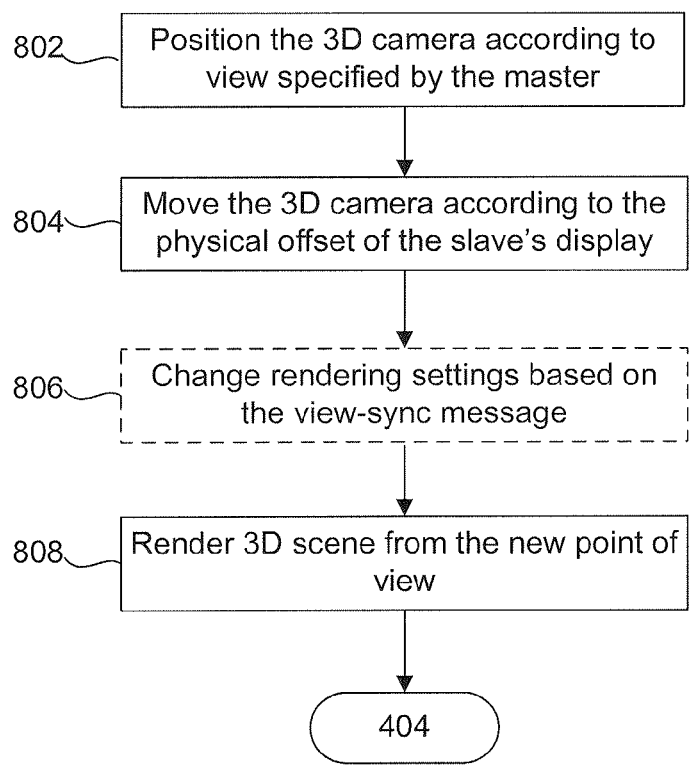
FIG. 8 is a process flowchart of an exemplary method for drawing a frame based on view-synchronization information extracted from a view-synchronization message, according to an embodiment.

The determined camera position and orientation (e.g., in step 410) can then be used to draw the frame in step 412. FIG. 8 is a process flowchart of an exemplary method 800 for drawing a frame based on view-synchronization information (step 412) extracted from a view-synchronization message (step 410) according to an embodiment. Method 800 begins in step 802, in which the virtual three-dimensional camera is positioned according to the view specified by the master in the view-synchronization message. In step 804, the virtual camera is moved according to the physical offset (e.g., stored in the camera position settings of configuration file 254, as described above) of the display coupled to the slave device. Method 800 can then proceed to optional step 806 of changing any rendering settings based on the extracted view-synchronization information. For example, step 806 may be advantageous for GIS systems, as described below. Method 800 then proceeds to step 808, which includes rendering or drawing the three-dimensional content (e.g., a virtual three-dimensional computer-generated scene) from the new point of view of the virtual camera, as modified according to the view-synchronization message.

Once the frame is drawn, methods 400 (after step 412) and 800 proceed back to step 404, which includes checking for received view-synchronization messages from the master device. Method 400 concludes after it is determined that the received message is an exit message in step 408.

Method 300 can be implemented on a master/message-sender device, such as, for example, device 110 in system 100 of FIG. 1. Method 400 can be implemented on multiple slave/message-receiver devices, such as, for example, devices 120, 130, 140, 150, 160, and 180 in system 100 of FIG. 1. One benefit of using method 300 in combination with method 400 includes creating an immersive experience for viewing and navigating three-dimensional digital content that does not require computing devices with specialized hardware.

IV. EXAMPLE OF INTEGRATING VIEW-SYNCHRONIZATION IN GIS SYSTEMS

Embodiments can be used for viewing and navigating through simulated three-dimensional environments from the perspective of a virtual camera, as described above. The virtual camera in a three-dimensional environment is used to define the three dimensional content data to be displayed. The virtual camera has a perspective according to its position and orientation. By changing the perspective of the virtual camera, a user can navigate through the three-dimensional environment. As described above, the user can control the perspective of the virtual camera by using a user input device including, but not limited to, a joystick, track pad, game controller, keyboard, or mouse.

A geographic information system (hereinafter "GIS system") is one type of system that uses a virtual camera to navigate through a three-dimensional environment. A GIS system is a system for storing, retrieving, manipulating, and displaying a substantially spherical three-dimensional model of the Earth. The three-dimensional model may include satellite images texture mapped to terrain, such as mountains, valleys, and canyons. Further, the three-dimensional model may include buildings and other three dimensional features.

The virtual camera in the GIS system may view the spherical three dimensional model of the Earth from different perspectives. An aerial perspective of the model of the Earth may show satellite images, but the terrain and buildings may not be displayed. On the other hand, a ground-level perspective of the model may show the terrain and buildings in detail.

The following example illustrates how a GIS system can be integrated with embodiments of system 100 of FIG. 1 and device 200 of FIG. 2, as described above. As mentioned previously, device 200, as described above, can be used to implement each of devices 110, 120, 130, 140, 150, 160, 170, and 180. As illustrated in FIG. 1, displays 115, 125, 135, 145, 155, 165, 175, and 185 are coupled to the devices and can be physically arranged in a circular pattern to surround a user (not shown). The devices shown in system 100 operate in a master-slave configuration. For example, device 110 may be designated to be the master device while devices 120, 130, 140, 150, 160, 170, and 180 may be designated to be the slave devices.

Each of devices 110, 120, 130, 140, 150, 160, 170, and 180 can be configured to execute a GIS client application, such as, for example, the GOOGLE EARTH client. Further, each of devices 110, 120, 130, 140, 150, 160, 170, and 180 uses a configuration file (e.g., configuration file 254) stored, for example, in local memory. The configuration file is used to specify the relationships between the devices. For example, the configuration file may comprise the following information: designation of whether the device is a master (message-sender) or a slave (message-receiver), virtual camera position settings (e.g., pitch, yaw, and roll offset from the sender), horizontal field of view, network port to send or receive messages, network hostname (or IP address) to send view-synchronization messages, and portion of view frustum to draw. Each device draws the same field of view, but a different portion of a view frustum that comprises three-dimensional GIS content data. Each portion of the view frustum is displayed on each of displays 115, 125, 135, 145, 155, 165, 175, and 185, thereby creating a tiled media wall, as described above.

The GIS content data to be displayed may comprise 360-degree panoramic imagery, for example, of rural or urban landscapes. Such panoramic imagery can be captured using imaging systems that include more than one camera in a rosette formation attached to a vehicle. For example, a rosette formation of eight cameras may be used to capture the panoramic images, for example, along a city street, where each camera captures a portion of a complete panoramic scene. The panoramic image views captured by each camera in such an eight-camera system can be displayed on each of eight display screens, such as, for example, displays 115, 125, 135, 145, 155, 165, 175, and 185. Further, the use of view-synchronization messages, as described above, between devices 110, 120, 130, 140, 150, 160, 170, and 180 synchronizes the views displayed on displays 115, 125, 135, 145, 155, 165, 175, and 185, thereby creating a 360-degree tiled media display surrounding the user. This provides the user with the illusion of looking out multiple windows into the simulated three-dimensional world.

As described above, the view-synchronization message can include, for example, a sequence number for each image frame and virtual camera parameters. In a GIS system, such as GOOGLE EARTH, the view-synchronization message may also include time parameters corresponding to a window in time of active GIS content data to draw. For example, the GIS viewer may be a space-time viewer and the content that is to be drawn or displayed may correspond to historical imagery. Thus, the values corresponding to the date of the historical imagery can be included in the view-synchronization message from the master/message-sender to the slave/message-receiver.

Additional view-synchronization information that may be included in a view-synchronization message for a GIS system can include data to specify GIS content feature activation (e.g., sunlight rendering, historical imagery rendering, terrain and terrain exaggeration, water surface rendering, photo mode rendering, and planet choice (Earth, Mars, Moon, etc.)). In an embodiment, in addition to content feature activation data, the content itself may be included in the view-synchronization message. One skilled in the relevant art given this description will understand that more or less activation and content data than what is listed herein may be used as necessary.

Figure 7:
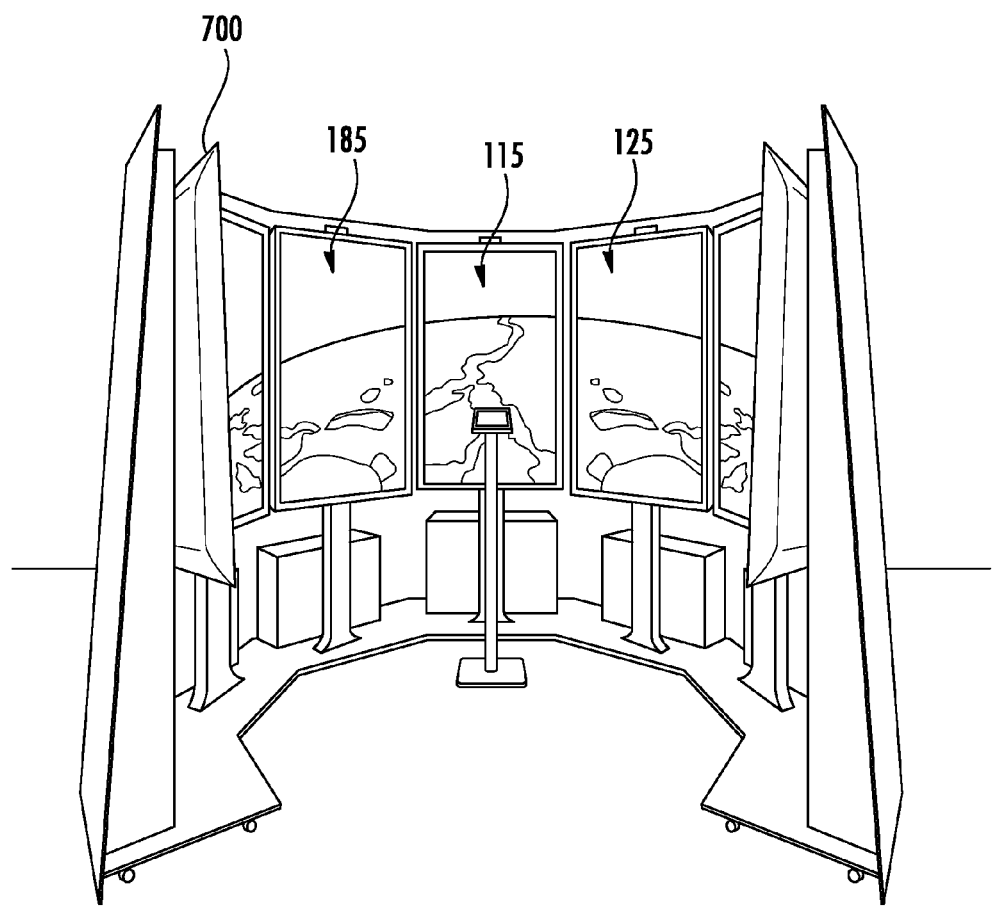
FIG. 7 is a photograph of an exemplary enclosure for arranging display screens, according to an embodiment.

In an embodiment, a special enclosure can be constructed to arrange the display screens as desired. FIG. 7 shows a photograph of an exemplary enclosure 700 for arranging display screens according to an embodiment. Although not entirely visible in FIG. 7, enclosure 700 comprises eight displays (e.g., displays 115, 125, and 185) that are each coupled to one of eight different computing devices. As described above, each computing device executes a GIS client application, such as GOOGLE EARTH, and all of the computing devices are synchronized over a network in order to display tiled views of the same GIS content in unison. The user, standing in a central location of the enclosure and facing the screens, is almost entirely surrounded by the screens. The user can use a user input device, as described above, to navigate through the virtual environment displayed by the GIS client on the multiple screens, thereby creating a seamless, immersive experience, i.e., a Liquid Galaxy, for the user. It would be apparent to a person skilled in the relevant art given this description that enclosure 700 may be modified as necessary to incorporate more or less displays or to add additional features, such as, for example, a door or entry mechanism for users to enter and exit the enclosure (e.g., if enclosure 700 were adapted to fully surround a user, in accordance with an embodiment).

In an embodiment, renderer module 220 can be used to implement the GIS client application on each device. One skilled in the art given this description will understand that, more or less modules than shown in device 200 and in renderer module 220 may be implemented in software to achieve the functionality described herein. Further, a person skilled in the relevant art given this description would appreciate that embodiments may also be integrated with video game software, in which each device executes a video game client application, allowing users to view and navigate through three-dimensional environments of a video game.

V. EXAMPLE COMPUTER SYSTEM IMPLEMENTATION

Embodiments shown in FIGS. 1-4, or any part(s) or function(s) thereof, may be implemented using hardware, software modules, firmware, tangible computer readable media having instructions stored thereon, or a combination thereof and may be implemented in one or more computer systems or other processing systems.

Figure 5:
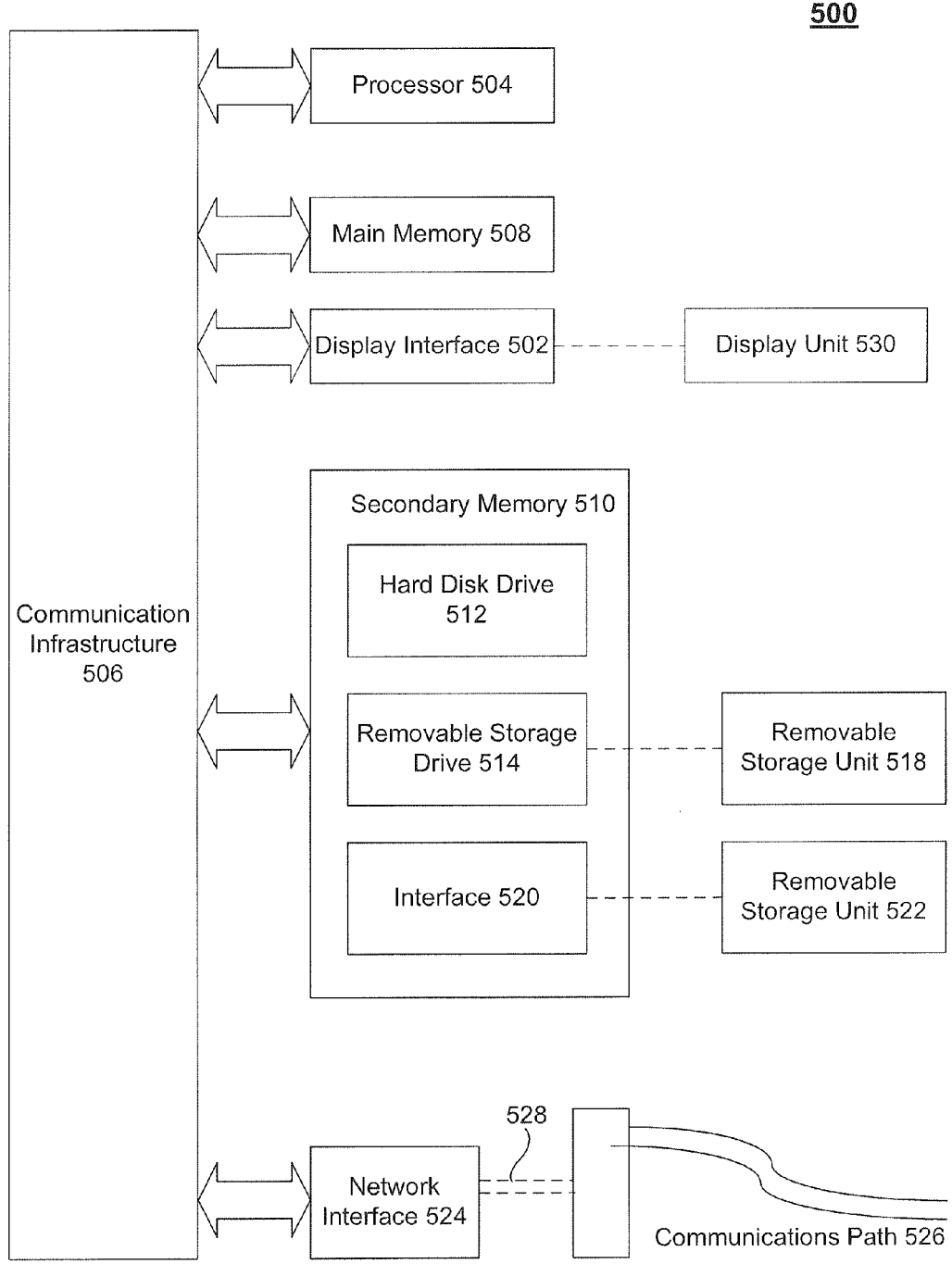
FIG. 5 is an illustration of an example computer system in which embodiments can be implemented.

FIG. 5 illustrates an example computer system 500 in which embodiments, or portions thereof, may be implemented as computer-readable code. For example, devices 110, 120, 130, 140, 150, 160, 170, and 180 in FIG. 1 and device 200 of FIG. 2, can be implemented in computer system 500 using hardware, software, firmware, tangible computer readable media having instructions stored thereon, or a combination thereof and may be implemented in one or more computer systems or other processing systems. Hardware, software, or any combination of such may embody any of the modules and components in FIGS. 1-4.

If programmable logic is used, such logic may execute on a commercially available processing platform or a special purpose device. One of ordinary skill in the art may appreciate that embodiments of the disclosed subject matter can be practiced with various computer system configurations, including multi-core multiprocessor systems, minicomputers, mainframe computers, computer linked or clustered with distributed functions, as well as pervasive or miniature computers that may be embedded into virtually any device.

For instance, at least one processor device and a memory may be used to implement the above described embodiments. A processor device may be a single processor, a plurality of processors, or combinations thereof. Processor devices may have one or more processor "cores."

Various embodiments of the invention are described in terms of this example computer system 500. After reading this description, it will become apparent to a person skilled in the relevant art how to implement the invention using other computer systems and/or computer architectures. Although operations may be described as a sequential process, some of the operations may in fact be performed in parallel, concurrently, and/or in a distributed environment, and with program code stored locally or remotely for access by single or multiprocessor machines. In addition, in some embodiments the order of operations may be rearranged without departing from the spirit of the disclosed subject matter.

Processor device 504 may be a special purpose or a general purpose processor device. As will be appreciated by persons skilled in the relevant art, processor device 504 may also be a single processor in a multi-core/multiprocessor system, such system operating alone, or in a cluster of computing devices operating in a cluster or server farm. Processor device 504 is connected to a communication infrastructure 506, for example, a bus, message queue, network, or multi-core message-passing scheme.

Computer system 500 also includes a main memory 508, for example, random access memory (RAM), and may also include a secondary memory 510. Secondary memory 510 may include, for example, a hard disk drive 512, removable storage drive 514. Removable storage drive 514 may comprise a floppy disk drive, a magnetic tape drive, an optical disk drive, a flash memory, or the like. The removable storage drive 514 reads from and/or writes to a removable storage unit 518 in a well known manner. Removable storage unit 518 may comprise a floppy disk, magnetic tape, optical disk, etc. which is read by and written to by removable storage drive 514. As will be appreciated by persons skilled in the relevant art, removable storage unit 518 includes a computer usable storage medium having stored therein computer software and/or data.

In alternative implementations, secondary memory 510 may include other similar means for allowing computer programs or other instructions to be loaded into computer system 500. Such means may include, for example, a removable storage unit 522 and an interface 520. Examples of such means may include a program cartridge and cartridge interface (such as that found in video game devices), a removable memory chip (such as an EPROM, or PROM) and associated socket, and other removable storage units 522 and interfaces 520 which allow software and data to be transferred from the removable storage unit 522 to computer system 500.

Computer system 500 may also include a communications interface 524. Communications interface 524 allows software and data to be transferred between computer system 500 and external devices. Communications interface 524 may include a modem, a network interface (such as an Ethernet card), a communications port, a PCMCIA slot and card, or the like. Software and data transferred via communications interface 524 may be in the form of signals, which may be electronic, electromagnetic, optical, or other signals capable of being received by communications interface 524. These signals may be provided to communications interface 524 via a communications path 526. Communications path 526 carries signals and may be implemented using wire or cable, fiber optics, a phone line, a cellular phone link, an RF link or other communications channels.

In this document, the terms "computer program medium" and "computer usable medium" are used to generally refer to media such as removable storage unit 518, removable storage unit 522, and a hard disk installed in hard disk drive 512. Computer program medium and computer usable medium may also refer to memories, such as main memory 508 and secondary memory 510, which may be memory semiconductors (e.g. DRAMs, etc.).

Computer programs (also called computer control logic) are stored in main memory 508 and/or secondary memory 510. Computer programs may also be received via communications interface 524. Such computer programs, when executed, enable computer system 500 to implement the present invention as discussed herein. In particular, the computer programs, when executed, enable processor device 504 to implement the processes of the present invention, such as the stages in the methods illustrated by flowcharts 400, 500, 600, and 700 of FIGS. 4, 5, 6, and 7, respectively, discussed above. Accordingly, such computer programs represent controllers of the computer system 500. Where the invention is implemented using software, the software may be stored in a computer program product and loaded into computer system 500 using removable storage drive 514, interface 520, and hard disk drive 512, or communications interface 524.

Embodiments of the invention also may be directed to computer program products comprising software stored on any computer useable medium. Such software, when executed in one or more data processing device, causes a data processing device(s) to operate as described herein. Embodiments of the invention employ any computer useable or readable medium. Examples of computer useable mediums include, but are not limited to, primary storage devices (e.g., any type of random access memory), secondary storage devices (e.g., hard drives, floppy disks, CD ROMS, ZIP disks, tapes, magnetic storage devices, and optical storage devices, MEMS, nano-technological storage device, etc.), and communication mediums (e.g., wired and wireless communications networks, local area networks, wide area networks, intranets, etc.).

VI. VARIATIONS

As would be understood by a person skilled in the art based on the teachings herein, several variations of the above described features of synchronizing views across multiple computing devices can be envisioned. These variations are within the scope of embodiments of the present invention. For the purpose of illustration only and not limitation, a few variations are provided herein.

A. Graphical User Interface Extensions

For example, one skilled in the art can envision several variations for embodiments of system 100 of FIG. 1 and of view synchronization module 230 of device 200 illustrated in FIG. 2. For example, a variation may include configuring view synchronization module 230 to include a graphical user interface (GUI) for view-synchronization, which can allow classrooms and other groups to synchronize their views between multiple computers. Such a variation may be particularly advantageous for viewing geographic content from a GIS system, such as, for example, GOOGLE EARTH. In a further example, a variation may include configuring view synchronization module 230 to include a GUI that allows users to share control, seamlessly switching which device (e.g., in system 100) is sending (i.e., the master device), and which device is receiving (i.e., the slave device), on a frame-by-frame basis, dependent on user input. This would allow "conversational" sharing of digital content views between remote users.

B. Head-Tracking

In another variation, the position of the user's head or eyes may be determined relative to the display screen. This variation can be implemented in a number of ways. For example, a person skilled in the relevant art given this description would appreciate that several commercially available methods exist for tracking head and/or eye movements of a user relative to a display screen.

In general, a single point in three-dimensional space, corresponding to the bridge of the nose that bisects both eyes, is specified, as opposed to tracking the movement of both eyes of the user. Irrespective of the particular method used, the variation would include configuring each device (e.g., in system 100 of FIG. 1) to receive an input channel specifying the following information, as often as possible: X, Y spatial coordinates corresponding to the user's location, relative to the center of the screen (i.e., in-plane coordinates of the user with respect to the display screen) and the distance of the user from the screen, typically specified in units of screen-widths.

Using this information, the rendering application (e.g., renderer module 220 of FIG. 2) can be configured to change the projection or model-view matrix, such that objects would appear to be projected behind the screen. For example, as the user moves his/her head around the space, renderer module 220 would change the rendering of the frame accordingly, such that the monitor frame would appear like a virtual window frame. In addition, this variation includes using parallax effects for rendering objects closer in distance with respect to the virtual camera's and/or user's perspective as sliding in front of farther objects.

By integrating head-tracking with a 360-degree tiled view, as described above, it becomes possible to make a user feel as though they are standing inside of an observation tower. For example, the spaces between display screens would behave like the posts between windows. As the user moves his/her head around, scenery behind the posts becomes visible, and there is an illusion of a consistent three-dimensional space that is projected behind the plane of the display screen itself.

VII. CONCLUSION

It is to be appreciated that the Detailed Description section, and not the Summary and Abstract sections, is intended to be used to interpret the claims. The Summary and Abstract sections may set forth one or more but not all exemplary embodiments of the present invention as contemplated by the inventor(s), and thus, are not intended to limit the present invention and the appended claims in any way.

Embodiments of the present invention has been described above with the aid of functional building blocks illustrating the implementation of specified functions and relationships thereof. The boundaries of these functional building blocks have been arbitrarily defined herein for the convenience of the description. Alternate boundaries can be defined so long as the specified functions and relationships thereof are appropriately performed.

The foregoing description of the specific embodiments will so fully reveal the general nature of the invention that others can, by applying knowledge within the skill of the art, readily modify and/or adapt for various applications such specific embodiments, without undue experimentation, without departing from the general concept of the present invention. Therefore, such adaptations and modifications are intended to be within the meaning and range of equivalents of the disclosed embodiments, based on the teaching and guidance presented herein. It is to be understood that the phraseology or terminology herein is for the purpose of description and not of limitation, such that the terminology or phraseology of the present specification is to be interpreted by the skilled artisan in light of the teachings and guidance.

The breadth and scope of the present invention should not be limited by any of the above-described exemplary embodiments, but should be defined only in accordance with the following claims and their equivalents.

What is claimed is:

1. A computer-implemented method for real-time view synchronization comprising:
   receiving, by one or more second computing devices from a first computing device, a view synchronization message associated with a first view of media content from the first computing device, the first view rendered by the first computing device using a first display having a first physical location, wherein the first view is rendered from a first perspective of a first three-dimensional virtual camera located in a geographic information system (GIS) environment and wherein the view synchronization message includes a set of camera parameters, the set of camera parameters describing a position and orientation of the first virtual camera at the first perspective;

positioning, by the one or more second computing devices, a second three-dimensional virtual camera in the GIS environment according to the set of camera parameters included in the received view synchronization message associated with the first view;

obtaining, by the one or more second computing devices, from a configuration file a set of camera position settings associated with the one or more second computing devices, wherein the set of camera position settings includes one or more predefined camera offsets corresponding to a defined, static physical offset of a second physical location from the first physical location, the second physical location being associated with a second display, and wherein the set of camera position settings are pre-stored in the configuration file;

moving, by the one or more second computing devices, the second three-dimensional virtual camera according to the one or more camera offsets such that the second virtual camera has a second perspective providing a second view of the media content that is different from the first perspective; and rendering, by the one or more second computing devices, the second view of the media content from the second perspective of the second three-dimensional virtual camera, the second view rendered using the second display having the second physical location, such that the second view is synchronized in real time with the first view of the media content displayed on the first.

2. The method of claim 1, wherein the set of camera parameters comprises a position value corresponding to the first perspective of the three-dimensional virtual camera, wherein the positioning comprises:
positioning, by the one or more second computing devices, the second three-dimensional virtual camera according to the received position value corresponding to the first perspective of the three-dimensional virtual camera, and wherein the one or more camera offsets comprise a rotation value and the moving comprises:
rotating, by the one or more second computing devices, the second three-dimensional virtual camera based on the rotation value.

3. The method of claim 1, wherein the media content includes multiple synchronized video streams.

4. The method of claim 1, wherein the media content includes real-time graphical application content.

5. The method of claim 1, wherein the received view synchronization message associated with the first view includes a plurality of rendering parameters, and wherein the rendering further comprises:
rendering, by the one or more second computing devices, the second view of the media content based on the plurality of rendering parameters.

6. The method of claim 5, wherein the plurality of rendering parameters include lighting parameters corresponding to one or more frames of the media content.

7. The method of claim 5, wherein the plurality of rendering parameters include time parameters corresponding to one or more frames of the media content.

8. The method of claim 5, wherein the plurality of rendering parameters include feature content parameters corresponding to one or more frames of the media content.

9. The method of claim 1, wherein:
the view synchronization message further includes activation data associated with the first view of the media content, wherein the activation data identifies whether one or more content features of the first view are active or inactive; and rendering, by the one or more second computing devices, the second view of the media content further comprises rendering in the second view of media content, by the one or more second computing devices, the content features identified as active by the activation data included in the view synchronization message.

10. The method of claim 9, wherein the one or more content features comprise at least one of sunlight rendering, historical imagery rendering, water surface rendering, and photo mode rendering.

11. A computer-implemented method for real-time view synchronization comprising:
receiving user input from a user at a first computing device;
rendering, by the first computing device, a first view of media content using a first display, the first display having a first physical location, wherein the first view is displayed from a first perspective of a first three-dimensional virtual camera located in a geographic information system (GIS) environment; and
transmitting, by the first computing device, a view synchronization message based on the rendered first view to one or more second computing devices having one or more respective second displays respectively located at one or more second physical locations having respective defined, static physical offsets with respect to the first physical location, wherein the view synchronization message includes a set of camera parameters describing a position and orientation of the first virtual camera at the first perspective;

wherein the one or more second computing devices are configured to:
respectively position one or more second virtual cameras in the GIS environment according to the set of camera parameters included in the view synchronization message;
respectively more the one or more second virtual cameras according to one or more predefined camera offsets corresponding to the one or more respective defined, static physical offsets, such that one or more second views from one or more second perspectives are obtained, the one or more second perspectives being different from the first perspective, wherein the predefined camera offsets are included in a set of camera position settings associated with the one or more second computing devices, and wherein the set of camera position settings are pre-stored in a configuration file; and
respectively render the one or more second views from the one or more second perspectives of the second three-dimensional virtual camera in the GIS environment, different from the first perspective of the first three-dimensional virtual camera in the GIS environment, wherein the one or more second views are rendered by the one or more second computing devices using the one or more respective second displays, whereby the first and one or more second displays are physically arranged to at least partially surround the user so as to create an immersive and interactive three-dimensional experience for the user.

12. A method for real-time synchronization of views across a plurality of computing devices coupled to a plurality of displays on a network within a geographic information system (GIS) environment comprising:

(a) arranging the plurality of displays coupled to the plurality of computing devices in a formation around a common point to partially or fully surround a user;

(b) sending a view synchronization message from a master device of the plurality of computing devices, wherein the view synchronization message corresponds to a master view of media content;

(c) displaying the master view using a master display, of the plurality of displays, coupled to the master device, the master view displayed at a first perspective of a first three-dimensional virtual camera in the geographic information system (GIS) environment;

(d) receiving the view synchronization message from the master device at one or more slave devices of the plurality of computing devices, wherein the view synchronization message includes a set of camera parameters describing a position and orientation of the first virtual camera at the first perspective;

(e) positioning one or more second three-dimensional virtual cameras respectively associated with the one or more slave devices according to the set of camera parameters included in the view synchronization message;

(f) obtaining, from one or more configuration files, one or more sets of camera position settings respectively associated with the one or more slave devices, wherein the one or more sets of camera position settings are respectively pre-stored in the one or more configuration files, and wherein the set of camera position settings for each slave device includes one or more predefined camera offsets corresponding to a position of a slave display coupled to such slave device in the formation relative to a position of the master display in the formation, wherein the position of each slave display relative to the position of the master display is defined and static;

(g) adjusting the one or more second three-dimensional virtual cameras based on the one or more sets of camera position settings, such that one or more slave views are adjusted to one or more second perspectives of the second three-dimensional virtual cameras in the GIS environment, different from the first perspective of the first three-dimensional virtual camera in the GIS environment; and (h) displaying the one or more slave views of the media content synchronized with the master view using the one or more slave displays, of the plurality of displays, coupled to the one or more slave devices.

13. The method of claim 12, wherein the sending (b) comprises:

(i) determining a camera position and a rotation of a master virtual camera corresponding to the master view of the media content;

(ii) generating the view-synchronization message based on the determined camera position and rotation of the master virtual camera; and (iii) sending the generated view-synchronization message.

14. The method of claim 13, wherein the adjusting (g) comprises:

(i) extracting the camera position and rotation of the master virtual camera from the view-synchronization message; and (ii) adjusting one or more slave virtual cameras based on the extracted camera position and the rotation of the master virtual camera and the position of each or one or more slave displays in the formation relative to the position of the master display in the formation.

15. The method of claim 13, wherein the sending (b) further comprises:

(iv) determining a network address and a communication port, wherein the generated view-synchronization message is sent to the determined network address and the determined communication port.

16. The method of claim 15, wherein the determining the network address and the communication port comprises accessing the network address and the communication port from a configuration file stored at the master device.

17. The method of claim 16, wherein the network address is a UDP broadcast address.

18. The method of claim 12, wherein the media content comprises digital video streams.

19. The method of claim 12, wherein the displaying (c) comprises displaying a master section of a view frustum using the master display, of the plurality of displays, coupled to the master device, and wherein the displaying (h) comprises displaying slave sections of the view frustum using the one or more slave displays, of the plurality of displays, coupled to the one or more slave devices.

20. A system for real-time synchronization of views across a plurality of computing devices coupled to a plurality of displays on a network within a geographic information system (GIS), the plurality of displays arranged in a formation around a common point to partially or fully surround a user, the system comprising:

a master device, of the plurality of computing devices, to send a view synchronization message, wherein the view synchronization message corresponds to a master view of media content and includes a set of camera parameters describing the position and orientation of a first virtual camera providing a first perspective in the geographic information system (GIS) environment, the first perspective corresponding to the master view of the media content;

a master display, coupled to the master device, to display the master view; and one or more slave devices, of the plurality of computing devices, to receive the view synchronization message from the master device, the one or more slave devices coupled to one or more slave displays of the plurality of displays, to obtain one or more predefined camera offsets corresponding to a defined, static position of each of the one or more slave displays in the formation relative to a position of the master display in the formation, wherein the predefined camera offsets are included in a set of camera position settings associated with the one or more slave devices, the set of camera position settings being pre-stored in one or more configuration files from which they are respectively obtained by the one or more slave devices, and to adjust one or more second virtual cameras in the GIS environment from the first perspective based on the one or more predefined camera offsets, such that the one or more second virtual cameras are adjusted to one or more second perspectives in the GIS environment, different from the first perspective of the first three-dimensional virtual camera in the GIS environment, wherein the one or more slave displays are configured to display one or more slave views of the media content, the one or more slave views respectively corresponding to the one or more second perspectives of the one or more second virtual cameras.

\* \* \* \* \*